United States Patent [19]

Pfeifer

[11] Patent Number: 4,805,106
[45] Date of Patent: Feb. 14, 1989

[54] METHOD OF AND ARRANGEMENT FOR ORDERING OF MULTIPROCESSOR OPERATIONS IN A MULTIPROCESSOR SYSTEM WITH REDUNDANT RESOURCES

[75] Inventor: Randy D. Pfeifer, Warrenville, Ill.

[73] Assignee: American Telephone and Telegraph Company, AT&T Bell Laboratories, Murray Hill, N.J.

[21] Appl. No.: 73,400

[22] Filed: Jul. 9, 1987

Related U.S. Application Data

[63] Continuation of Ser. No. 661,967, Oct. 17, 1984, abandoned.

[51] Int. Cl.⁴ .................. G06F 11/16; G06F 9/30; G06F 13/16
[52] U.S. Cl. .................................................. 364/200
[58] Field of Search ... 364/200 MS File, 900 MS File; 371/20, 60

[56] References Cited

U.S. PATENT DOCUMENTS

| | | | |
|---|---|---|---|
| 3,623,014 | 11/1971 | Doelz et al. | 364/200 |
| 3,833,798 | 9/1974 | Huber et al. | 371/10 |
| 3,889,237 | 6/1975 | Alferness et al. | 340/172.5 |
| 4,015,426 | 3/1977 | Hopkins, Jr. et al. | 371/10 |
| 4,187,538 | 2/1980 | Douglas et al. | 364/200 |
| 4,205,373 | 5/1980 | Shah et al. | 364/200 |
| 4,257,099 | 3/1981 | Appelt | 364/200 |
| 4,363,094 | 12/1982 | Kaul et al. | 364/200 |
| 4,363,096 | 12/1982 | Comfort et al. | 364/200 |
| 4,370,708 | 1/1983 | Bruce et al. | 364/200 |
| 4,371,754 | 2/1983 | De et al. | 371/10 |
| 4,371,928 | 2/1983 | Barlow et al. | 364/200 |
| 4,374,414 | 2/1983 | Comfort et al. | 364/200 |
| 4,400,775 | 8/1983 | Nozaki et al. | 364/200 |
| 4,466,098 | 8/1984 | Southard | 371/9 |
| 4,545,015 | 10/1985 | Baunach et al. | 364/200 |
| 4,562,535 | 12/1985 | Vincent et al. | 364/200 |
| 4,580,243 | 4/1986 | Renner et al. | 371/61 |
| 4,594,657 | 6/1986 | Byrns | 364/900 |
| 4,604,694 | 8/1986 | Hough | 364/200 |
| 4,608,688 | 8/1986 | Hansen et al. | 371/10 |
| 4,621,318 | 2/1987 | Maeda | 364/200 |
| 4,636,942 | 1/1987 | Chen et al. | 364/200 |

FOREIGN PATENT DOCUMENTS 0116344 8/1984 European Pat. Off. .............. 371/10
1338943 11/1973 United Kingdom .

OTHER PUBLICATIONS

IBM "System/370 Principles of Operation", pp. 7-12 to 14 and 7-39.

(List continued on next page.)

Primary Examiner—Gary V. Harkcom
Assistant Examiner—Lawrence E. Anderson
Attorney, Agent, or Firm—David Volejnicek

[57] ABSTRACT

To lock use of shared information to itself in a multiprocessor system (100) having two independently and asynchronously operating processors (101, 111) whose main store units (102, 112) duplicate each other's contents, a processor must cause an atomic read-modify-write (RMW) operation to be executed on a semaphore in the duplicated main store units of both processors. To properly order execution of multiple such RMW operations, arbiters (106, 116) of system buses (105, 115) of the two processors communicate over an interarbiter channel (121). The arbiter of a source processor that wishes to perform an RMW operation notifies the other processor's arbiter over the interarbiter channel. Simultaneous attempts at notification by both arbiters are resolved in favor of one of them that is designated the master. The notifying arbiter prevents its processor from performing another RMW operation until the one RMW operation has completed thereon, but permits other operations to proceed normally. The notifying arbiter prevents its processor from performing another RMW operation until the one RMW operation has been transferred via interprocessor links (107, 117) and bus (120) from the source processor to the notified arbiter's processor and has been performed thereon, but permits other operations to proceed normally. Thus multiple RMW operations are performed on both processors in the same order asynchronously and without impacting performance of other operations.

25 Claims, 6 Drawing Sheets

OTHER PUBLICATIONS

I. K. Hetherington et al., "3B20D Processor Memory Systems", *The Bell System Technical Journal*, V. 62, No. 1, (1-1983), pp. 207-220.

Y. Lee et al., "Design and Evaluation of a Fault-Tolerant Multiprocessor Using Hardware Recovery Blocks", *IEEE Transactions on Computers*, V. C-33, No. 2 (2-1984), pp. 113-124.

T. Hirota et al., "Computer-Aided Design of Software Module: Validity of Concurrent Processing on On-Line File", *Proceedings of 3d U.S.A.-JAPAN Computer Conference*, (10-12 Oct. 1978, NY), pp. 220-224.

N. T. Christensen, "Programmable Priority Mechanism" *IBM Technical Disclosure Bulletin*, vol. 17, No. 7 (12-74).

Z. Kohavi, *Switching and Finite Automata Theory*, (2d ed.), McGraw-Hill, 1978, Ch. 9.

J. Klir and L. Seidl, *Synthesis of Switching Circuits*, Gordon and Breach Science Pubs., 1968, pp. 203-205.

M. Mano, *Computer Logic Design*, Prentice-Hall, Inc., 1972, Ch. 7.

METHOD OF AND ARRANGEMENT FOR ORDERING OF MULTIPROCESSOR OPERATIONS IN A MULTIPROCESSOR SYSTEM WITH REDUNDANT RESOURCES

CROSS REFERENCE TO RELATED APPLICATION

This application is a continuation of application Ser. No. 661,967, filed Oct. 17, 1984, now abandoned.

This invention relates to multiprocessor systems in general, and in particular concerns a method of and an arrangement for ordering of execution of a plurality of operations, such as replicated-resource-locking operations, in a plurality of processors of a multiprocessor system.

BACKGROUND OF THE INVENTION

In a multiprocessing environment, a plurality of processes execute on a processing system simultaneously, either on a single processor on a time-shared basis or on a multiplicity of processors. Often a plurality of processes in such an environment share the use of a resource, such as information stored in a memory. To ensure that access to the shared resource is made by only one process at a time, some locking mechanism must be used that allows only one process to access the resource at any one time, and locks out the other processes from accessing the resource at that time. In the case of shared information, the information is generally stored in memory, and hence the locking mechanism must control access to the memory, or at least to that portion of the memory wherein the shared information is stored.

A type of locking mechanism used widely in multiprocessing systems is a semaphore. A semaphore is traditionally implemented as a register or a designated memory location on which is performed a read-and-clear operation, a test-and-set operation, a read-modify-write operation, or some other form of a memory operation that performs an atomic read-modify-write function. An atomic read-modify-write function is one during whose execution no other register or memory references are permitted between the read and write portions of the operation.

In order to provide increased system reliability and to lessen contests between processors for memory access, some multiprocessor systems use duplicated, and perhaps even more extensively replicated, memories. For example, a coprocessing system commonly comprises two simultaneously-active but independent processors, each having its own memory that duplicates the contents of the other processor's memory. In multiprocessor systems having replicated memory, the concept of a semaphore has been extended to force a locking operation, such as a read-modify-write operation, to occur simultaneously in all replicated memories. For if one processor in such a system were to perform a locking operation on its own memory only, then it will have failed to signal the other processors that the information guarded by the semaphore is locked. And if the one processor were to lock all replicated memories but not at the same time, the possibility would ordinarily exist that more than one processor would lock its own memory and then attempt to lock the other memories, only to find that at least some of them have already been locked by other processors. This condition, known as deadlock, results in none of the processors getting access to the information that is protected by the lock.

While solving the deadlock problem, the requirement that the locking operation occur simultaneously in all replicated memories has serious drawbacks in terms of system performance. For while the various resources—such as communication buses required to access the memories—that are needed to perform the operation simultaneously are being marshalled in the plurality of processors, other processing activity of these processors must effectively cease and cannot continue until the necessary resources have been secured in all processors, the locking operation has been performed in all processors, and the marshalled resources have been released. The amount of time wasted in so synchronizing the execution of the locking operation in all processors may significantly impair the processing throughput of the multiprocessor system. From this standpoint, then, the need for such synchronization is undesirable.

SUMMARY OF THE INVENTION

This invention is directed to solving these and other disadvantages of the prior art. According to the invention, an apparatus such as a multiprocessor system whose processors operate simultaneously but asynchronously of each other includes an arrangement that performs a method of ordering of multiprocessor operations. Multiprocessor operations are a set of predetermined operations, for example replicated resource locking operations, which each processor can perform on a replicated resource and whose performance involves performing them on a plurality of the resource copies. The arrangement responsive to perforance by a processor of a multiprocessor operation on the replicated resource, for preventing all other processors from performing a multiprocessor operation on a given copy of the resource until the operation is performed on that given copy of the resource. In the meantime, however, the arrangement allows performance of any non-multiprocessor operations.

Preferably, the arrangement responds to a request by a processor to perform a multiprocessor operation by (a) allowing the requested operation to be performed when all previously-allowed multiprocessor operations have been performed on all copies of the resource, and (b) by preventing the requested multiprocessor operation from being performed until all previously-allowed multiprocessor operations have been performed on all copies of the resource. Advantageously, each of processors includes for its use a copy of the resource, such as a shared memory, that is replicated in the others of the processors and the multiprocessor operations are operations for locking copies of the replicated resource, such as atomic read-modify-write operations.

In a multiprocessor system such as has just been described, an operation such as an operation for locking a shared replicated resource whose order of execution vis-a-vis other such operations is critical is advantageously permitted to be performed at different times on each of a plurality of the processors, without fear of interference from other such operations, because the system ensures that multiple such operations are performed on each of the resource copies in the same order. Yet other operations are not prevented from being performed on a resource copy while that resource copy is waiting to have the one operation performed thereon and while the one operation may be in the process of being performed on another copy of the resource.

Operations included among the multiprocessor operations may be the same or a different type of operation. For example, all types of operations that can change the contents of storage locations, such as write, read-modify-write, and test-and-set operations, may be considered to be multiprocessor operations. Alternatively, only multiple instances of the same type of operation may be considered to be included among the multiprocessor operations. For example, each attempt by each of a plurality of processors or processor units to perform a read-modify-write operation may constitute an instance of the same operation. Asynchronous operation or execution, for purposes of this application, means that an operation that must be performed on a plurality of resource copies need not be performed on those resource copies simultaneously, but rather may be performed on each of the resource copies at some different time, for example while other operations are being performed on the other resource copies.

According to an embodiment of the invention, the instruction ordering arrangement comprises a plurality of units a different one associated with each resource copy and each responsive to performance by a processor on the associated resource copy of a multiprocessor operation notifying thereof the other units and responsive to receipt of notification from another unit for preventing all other processors from performing any multiprocessor operation on the associated resource copy until the operation is performed on the associated resource copy, while permitting any non-multiprocessor operations to be performed.

Preferably, a processor generates a first signal, (e.g., intraprocessor request), to request a multiprocessor operation, and performs the requested operation in response to receipt of a second signal, (e.g., intraprocessor grant). The instruction-ordering arrangement then includes a plurality of units a different one associated with each resource copy (a) responsive to receipt of a first signal for issuing a third signal, (e.g., interprocessor request), to the other units, (b) responsive to receipt of a third signal for sending a fourth signal, (e.g., interprocessor grant) to the unit from which the third signal was received only when performance on the associated resource copy of a multiprocessor operation has followed sending by that unit of each prior fourth signal, and sending the second signal to the requesting processor only when performance on the associated resource copy of a multiprocessor operation has followed sending by the unit of each prior fourth signal.

Because an operation, such as a semaphore atomic read-modify-write operation, that involves more than one resource copy may be performed asynchronously on a plurality of resource copies, most processing activities of the individual processors do not have to be stopped in order to await synchronized execution and completion of the operation on multiple resource copies. Rather, processing activities of individual processors may continue independently of whether or not some processor is at that moment performing on some resource copy the operation that will eventually have to be performed on their copies of the resource. Hence a resource-locking mechanism is provided in an asynchronous multiprocessor system having shared replicated memories without adversely impacting the processing throughput of the system.

These and other advantages and features of the present invention will become apparent from the following description of an illustrative embodiment of the invention taken together with the drawing.

DETAILED DESCRIPTION

Figure 1:
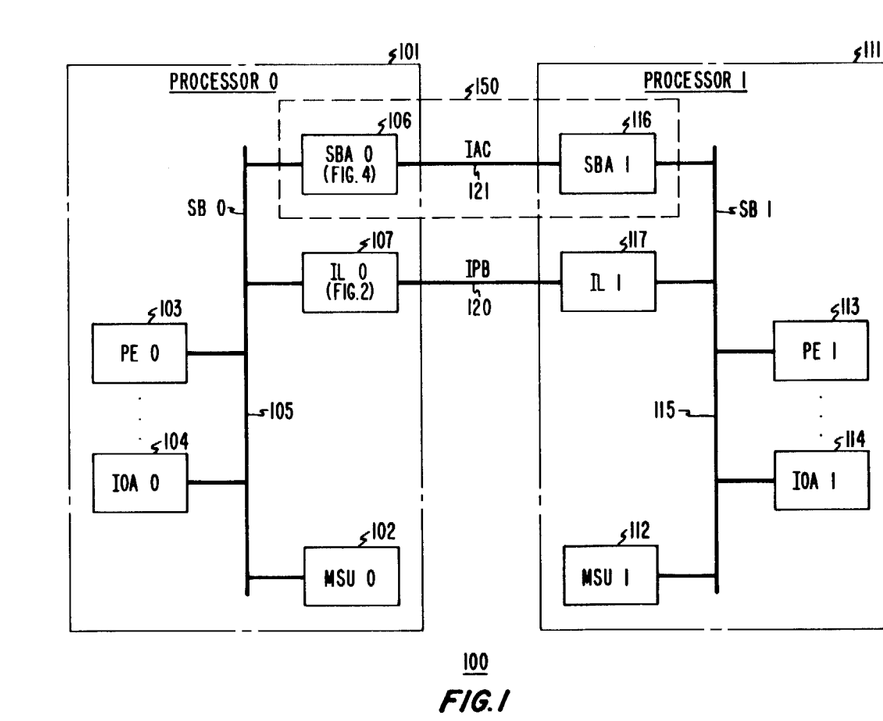
FIG. 1 is a block diagram of a processing system embodying an illustrative example of the invention.

Turning to FIG. 1, there is shown a coprocessor system 100. The coprocessor system 100 is a multiprocessor system comprising a pair of processors 101 and 111 that operate independently from a asynchronously of each other. Generally both processors 101 and 111 are active and each processor 101 and 111 is performing tasks independently of the other processor. Execution of operations that must be performed on both processors 101 and 111 is not synchronized in the two processors 101 and 111, but rather such operations are generally executed on each of the processors 101 and 111 at different times.

Though the processors 101 and 111 are independent, each has for its own use a main store unit (MSU) 102 and 112, respectively, which generally duplicates the contents of the other main store unit. In the general mode of operation, changes to the contents of the one main store unit are also made to the contents of the other main store unit to keep their contents duplicated. This mode of operation is referred to as the update mode. The memory duplication allows either one of the processors 101 and 111 to take over the execution of all system tasks upon failure or other removal from service of the other processor. During the second mode of operation, the contents of the main store units 102 and 112 may cease to duplicate each other. The second mode is entered only in exceptional situations, for example when maintenance operations are being performed on one of the processors following its failure.

An exemplary system of this nature is disclosed in U.S. patent application Ser. No. 623,481, filed on June 22, 1984, in the name of T. P. Bishop et al. and entitled "Reconfigurable Dual Processor System", which application is assigned to the same assignee as this application.

For purposes of this application, the designations "0" and "1" will be used to identify and distinguish the two processors 101 and 111 and their components. This is simply an arbitrary naming convention for purposes of clarity, and no special properties are associated with the "side0" and "side1" designations. For purposes of this appliction, the processor0 101 and the processor1 111 are identical.

Aside from the main store unit (MSU0) 102 mentioned above, the processor0 101 includes at least one processing unit. Included among the at least one processing unit are one or more processing elements (PE0) 103 which act as the central processing portion of the processor0 101. Also commonly included are other intelligent devices, such as input and output adaptors (IOA0) 104 which facilitate communications between the processor0 101 and the outside world. The actual number and type of processing units included in the processor0 101 is irrelevant for purposes of this application.

The processing units 103 and 104 are connected to the MSU0 102 by a system bus (SB0) 105. The function of the SB0 105 is to convey information between the various units of the processor0 101 that are attached thereto. The SB0 105 is a time-multiplexed bus. Access to the SB0 105 by units that are connected thereto, and transfer of information during each bus time slot from one unit to another across the bus 105, is controlled by a system bus arbiter (SBA0) 106, which is also connected to the SB0 105.

Also connected to the SB0 105 is an interprocessor link (IL0) 107. The IL0 107 performs the function of allowing units of the processor0 101 to communicate with units of the processor1 111. In particular, the IL0 107 is the means by which the contents of the MSU0 102 and the MSU1 112 are kept identical, and the means by which a processing unit of the processor0 101 may request a memory operation to be performed in the MSU1 112 of the processor1 111.

As was mentioned above, the processors 101 and 111 are identical for purposes of this application. Hence the processor1 111 comprises the main store unit (MSU1) 112, at least one processing element (PE1) 113, an optional input and output adaptor (IOA1) 114, a system bus (SB1) 115, a system bus arbiter (SBA1) 116, and an interprocessor link (IL1) 117, which devices are equivalent to the like devices discussed in conjunction with the processor0 101.

To enable communications to proceed between the two processors 101 and 111, the interprocessor links 107 and 117 are interconnected by an asynchronous interprocessor bus (IPB) 120. The interprocessor bus 120 allows transfer of information between the links 107 and 117.

The system bus arbiters 106 and 116 of the two processors 101 and 111 are likewise interconnected for communication, by an interarbiter channel (IAC) 121. Aside from performing conventional system bus access arbitration functions, the arbiters 106 and 116, together with the interarbiter channel 121, comprise a complex 150 whose function it is to control the undertaking in the system 100 of operations that are to be undertaken on both processors 101 and 111. Various elements of the complex keep both processors 101 and 111 notified of undertaking of any such operation on either of the processors, determine whether such operations is being undertaken on either of the processors, and prevent a plurality of such operations from being undertaken in different order on one of the processors than on the other of the processors. In particular, the interarbiter channel 121 enables one arbiter to notify the other when a processing unit of the one arbiter's processor initiates a read-modify-write (RMW) operation which must be performed on the main store of both processors, and to determine whether a like operation is being performed by the other processor. Each arbiter, through cooperation with the other arbiter via the IAC 121, prevents another RMW operation directed to both processors from being performed on its associated processor, when one such RMW operation is being performed on one of the processors, until the one RMW operation is performed on the associated processor. However, other operations are permitted to be performed during this time. The operation of the complex 150 in accomplishing these functions will be described more fully as part of the consideration of the structure and function of the arbiters 106 and 116.

Figure 4:
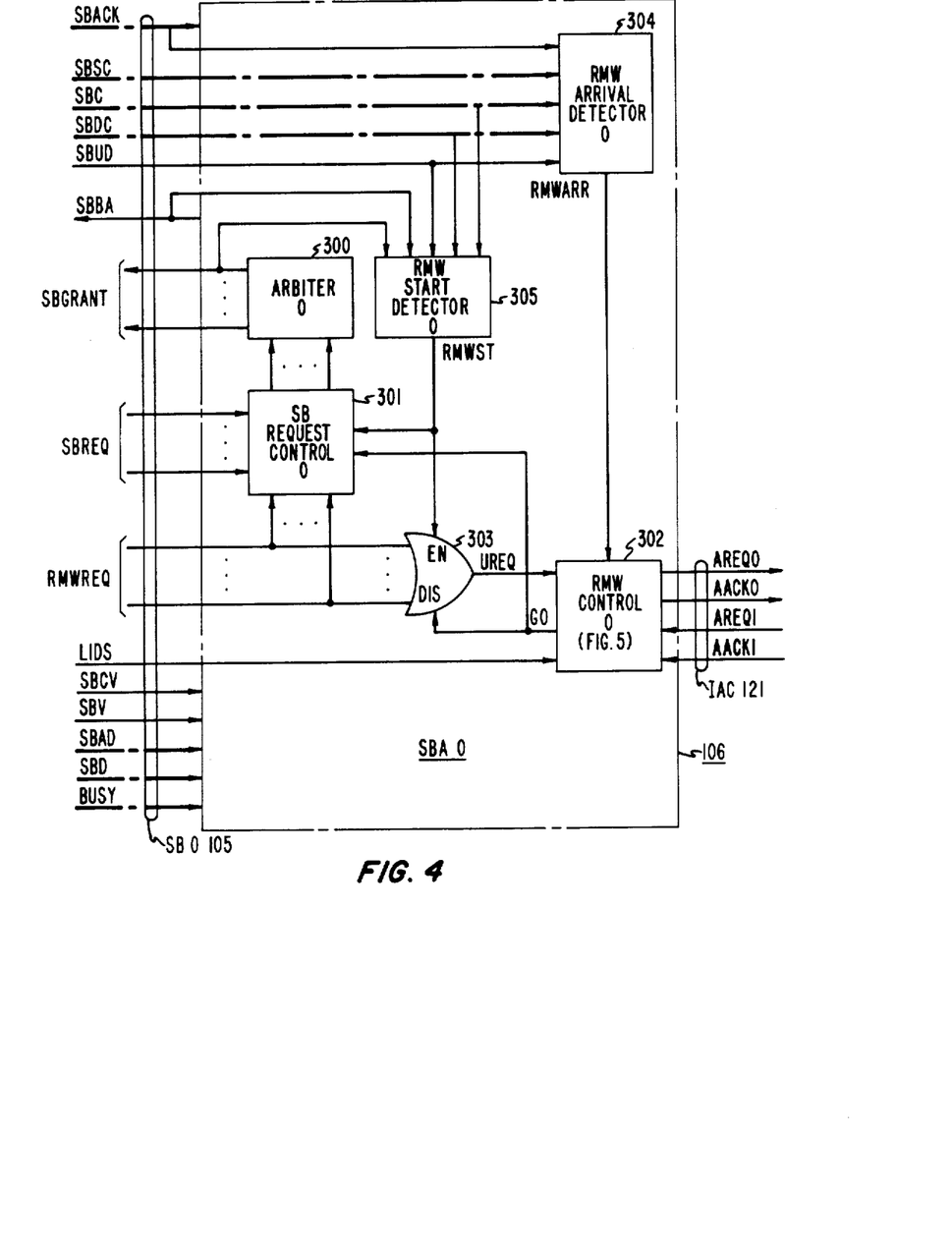
FIG. 4 is a block diagram of a system bus arbiter of the system of FIG. 1.

Considering now the protocol of the system buses 105 and 115, reference is made to FIG. 4 which shows certain of the buses and signal lines that comprise the system bus 105 connecting to the system bus arbiter 106. The structure and operation of the system bus 115 are equivalent to that of the bus 105. The system bus 105 is a high-speed, synchronous, time-multiplexed, transaction-based bus. During each bus time slot, the arbiter 106 controls transfer across the bus 105 of information from one unit of the processor0 101 to another. The next time slot may be used for a transfer of information between two completely different units. A source unit requesting something from another, the destination, unit will not hold up the bus 105 while the destination unit honors the request. Instead, the source unit uses a bus time slot to make the request, and the destination unit uses a bus time slot at some later time to respond to the request. The time slots between the request time slot and the response time slot may be used for other transactions.

The transfer of information from one unit to another is referred to as a transaction. A transaction may require more than one bus time slot to complete. For example, if a unit wishes to perform a multiword transfer of data to another unit, the arbiter 106 will assign to the source unit as many consecutive time slots as are necessary to transfer all of the words.

In addition to transferring addresses and data, the system bus 105 carries source and destination codes to identify the units involved in a transaction. A transaction also includes a command field to indicate the type and size of the transaction.

The system bus 105 includes a system bus request (SBREQ) and a system bus grant (SBGRANT) line for each unit capable of using the system bus 105. In addition, the system bus 105 includes a read-modify-write request (RMWREQ) line for each unit capable of initiating a read-modify-write (RMW) operation that must be performed on both processors 101 and 111. The SBREQ, RMWREQ, and SBGRANT signal lines of the bus 105 connect to the arbiter 106.

As will be made clear below, another type of RMW operation also exists which is performed on only one of the processors 101 and 111. This type of RMW operation is performed only when the processors 101 and 111 are not in update mode, i.e., the contents of the main store units 102 and 112 are not being kept identical. Whether or not the processors 102 and 112 are or are not in update mode is indicated by the state of a SBUD signal line of the system bus 105.

A unit wishing to use the system bus 105 asserts its dedicated SBREQ line. If a unit wishes to use the system bus 105 for the purpose of causing an RMW operation to be performed on both processors 101 and 111, it likewise asserts its dedicated RMWREQ line. If the requesting unit is not granted the next bus time slot, its request line or lines remain active. The unit is effectively prevented from accessing the bus, and hence from performing the RMW operation, until the arbiter 106 issues to it a system bus grant signal.

When the unit receives the SBGRANT signal from the arbiter 106, it negates its SBREQ line, and also its RMWREQ line if it was asserted. That unit then issues the address, data, source code, destination code, and command that make up the transaction onto the SBAD, SBD, SBSC, SBDC, and SBC buses respectively, of the system bus 105, and asserts the bus valid (SBV) and command valid (SBCV) signal lines of the system bus 105.

When the information that has been gated out onto the system bus 105 has been conveyed by the bus 105 to all of the other units attached to the system bus 105, each unit, unless it is busy, inspects the destination code, (and the command field, in the case of the link 107 and the arbiter 106) to see if the unit is a destination of the current transaction. If a non-busy unit is a destination, it latches the information present on the system bus 105, and then issues a system bus acknowledge signal to the arbiter 106, by asserting its dedicated system bus acknowledge (SBACK) line. A busy unit maintains asserted its dedicated BUSY signal line instead.

The arbiter 106 knows which units are destinations of the transaction from having inspected the destination code and command field, and it looks at the BUSY signal line of each destination unit. If any of the destinations are busy, the arbiter 106 aborts the transaction, by asserting a busy abort (SBBA) signal line of the system bus 105. When the source unit receives the busy abort signal, it once again asserts its SBREQ line to request the system bus for a later time slot.

A unit, including the arbiter 106, knows how many time slots a transaction will take from examining the command information that has been gated onto the system bus 105 by the source unit. In the case of a multiple time slot transaction, the arbiter 106 asserts the SBGRANT line of the requestor unit for each time slot of the transaction. Likewise, destination units pulse their SBACK signal lines during each time slot of the multiple time slot transaction. However, the source unit does not assert its request line or lines during every time slot of a transaction it has been granted.

Figure 2:
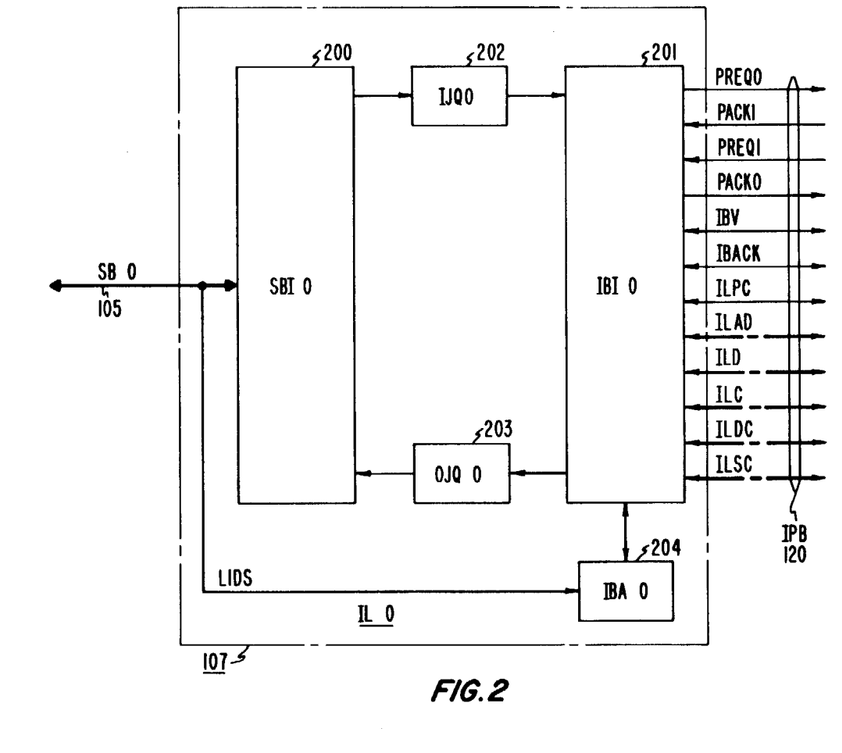
FIG. 2 is a block diagram of an interprocessor link of the system of FIG. 1.

Before discussing in more detail the arbiter 106 shown in FIG. 4, it will be helpful to describe the operation of interprocessor links 107 and 117. A block diagram of the link 107 is shown in FIG. 2. The structure and operation of the link 117 are equivalent to that of the link 107. The link 107 is divided into five major functional blocks: a system bus interface (SBI0) 200, an interprocessor bus interface (IBI0) 201, an input job queue (IJQ0) 202, an output job queue (OJQ0) 203, and an interprocessor bus arbiter (IBA0) 204.

The system bus interface 200 connects to the system bus 105, and it is responsible for ensuring that the link 107 adheres to the protocol of the system bus 105. When the link 107 is not busy, the system bus interface 200 is constantly monitoring the system bus 105, looking for transactions which have the link 107 as their destination. The system bus interface 200 receives on the system bus 105 a potential transaction request to do an information transfer to the other processor 111 in the form of a command, a source code, a destination code, and an address. The request comes from a source unit in the processor 101 which has initiated the transaction.

The system bus interface 200 examines the destination code and the command of the transaction currently being sent out on the system bus 105 to determine whether the transaction is directed to link 107, i.e., whether the link 107 is one of the destinations of the transaction. The specification of the link 107 as the destination of the transaction may be either explicit or implicit. The link 107 is an explicit destination if the link is specified in the destination code or if an EXTERNAL bit of the destination code is set. This tells the link 107 to do a transfer to the unit of the processor1 111 that is specified in the destination code. The link 107 is an implicit destination if the transaction specifies the main store unit 102 as the destination, the operation is a write or an RMW, and the SBUD line indicates that the system is in update mode. The link 107 is not a destination if it is the source of the transaction.

If the link 107 is a destination, the sytem bus interface 200 latches the transaction information. The SBI0 200 includes source and destination code generation circuitry which then modifies the source and destination codes of the transaction for use by the link 117 of the processor1 111. This circuitry sets the EXTERNAL bit in the source code and clears the EXTERNAL bit in the destination code. This circuitry is also responsible for changing the source code to "link" if the received transaction is a read-modify-write operation to main store and the external specification was implicit.

The system bus interface 200 then transfers the transaction information to the input job queue 202.

The input job queue 202 holds work for the interprocessor bus interface 201. It has the capacity to hold a plurality, in this example 16, entries, with one entry corresponding to one system bus time slot. When the input job queue 202 contains 14 entries or more, the system bus interface 200 signals the arbiter 106 that it is busy. This means that it is unable to receive any more transaction packages. If another unit initiates a transaction which has the link 107 as one of its destinations, the arbiter 106 aborts that transaction. This continues until the input job queue 202 empties out enough so it has at least three unoccupied entry spaces, at which time the system bus interface 200 negates the busy indication.

While the input job queue 202 holds work for the interprocessor bus interface 202, the output job queue 203 holds information conveyed to the link 107 by the link 117 and waiting to be transferred out onto the system bus 105 by the system bus interface 200. Its capacity is three entries. However, it is not allowed to hold more than one system bus transaction at a time.

After the link 107 has received a transaction from the other link 117 into its output job queue 202, the system bus interface 200 asserts the link's SBREQ signal line. The link 107 does not have a RMWREQ signal line as it never initiates an RMW operation that involves both processors 101 and 111. The link 107 merely initiates on the processor0 101 the processor0-specific portion of an RMW operation that was originally initiated on the other processor1 111. When the arbiter 106 responds with a SBGRANT signal, the system bus interface 200 gates the source code, destination code, command field, address, and data, from the output job queue 203 onto the system bus 105. The other side link 117 is not permitted by the link 107 to copy another transaction to the output job queue 203 of the link 107 until the arbiter 106 has granted the SBREQ of the link 107 and the first entry of the output job queue 203 has been successfully transmitted over the system bus 105.

In situations when the destination to which the link 107 is sending the transaction is busy, the arbiter 106 will abort the transaction by asserting the BUSY ABORT signal line. When this happens, the system bus interface 200 will reassert the link's SBREQ lead and attempt the transaction again. When the system bus interface 200 of the link 107 successfully transfers the transaction to the destination unit, the destination unit asserts its dedicated SBACK line of the system bus 105 to inform the arbiter 106 thereof.

The interprocessor bus arbiter 204 is the part of the link 107 that determines which one of the links 107 and 117 has control of the interprocessor bus 120. The arbiter 204 performs arbitration between plural requests for use of the interprocessor bus 120. The arbiter 204 must arbitrate between transaction packages coming into the link 107 from the system bus 105 which are destined for the link 117 of the processor1 111, and transaction packages from the link 117 coming into the link 107 via the interprocessor bus 120.

The arbiter 204 uses a fixed priority scheme for determining which one of the links 107 and 117 has control of the interprocessor bus 120. Each link's arbiter has a link identification/slave (LIDS) signal line incoming thereto from a processing element of the associated processor. The LIDS signal lines are straps that designate one link as the master and the other link as the slave. If both links 107 and 117 request use of the interprocessor bus 120 simultaneously, the link designated as the master will have priority of use of the interprocessor bus 120 over the link designated as the slave, if there is no interprocessor bus transaction currently in progress. If there is a transaction in progress, the link that is not sending the current transaction package will be given use of the interprocessor bus 120 next to send its transaction package. This has the effect of alternating use of the interprocessor bus 120 between the two links 107 and 117.

The interprocessor bus 120 is arbitrated on the basis of transaction packages. That is, once the bus 120 has been granted to one of the links, that link will control the bus 120 until it has completed the transfer of all of the package. A package contains all of the information contained in one system bus transaction. Upon receiving the whole package from the other link, the receiving link may request use of its processor's system bus to initiate the transaction on its processor.

The interprocessor bus interface 201 is responsible for assuring that the link 107 adheres to the asynchronous protocol of the interprocessor bus 120. The interface 201 is responsible for transmitting information on the interprocessor bus 120, for receiving information over the bus 120, and for issuing and responding to interprocessor bus control signals.

When a transaction from the system bus 105 has been received, processed, and placed in the input job queue 207 by the system bus interface 200, the interprocessor bus interface 201 asserts the link's package request (PREQ0) lead of the interprocessor bus 120 to signal the link 117 on the other side that it has a transaction package to send. If the interprocessor bus arbiter of the link 117 determines that the link 107 should have control of the interprocessor bus 120, the link 117 asserts its package acknowledge (PACK1) lead of the interprocessor bus 120. When the interprocessor bus interface 201 of the link 107 receives the PACK1 signal, it gates the address, data, source code, destination code, and command that make up one input job queue entry onto the ILAD, ILD, ILSC, ILDC, and ILC buses, respectively, of the bus 120 and asserts the interprocessor bus valid (IBV) signal line of the bus 120. When the interprocessor bus interface of the link 117 receives the IBV signal, it latches the information from the bus 120 and transfers it to its own output job queue. The interprocessor bus interface of the link 117 then sends an interprocessor bus acknowledge (IBACK) signal to the link 107 to indicate that the information has been received.

When a transaction package occupies more than one queue entry, the IBV/IBACK signal handshake is repeated for the transfer of each entry. When the interprocessor bus interface 201 of the link 107 sends the last entry of the transaction, it asserts the interprocessor link package complete (ILPC) signal line of the interprocessor bus 120 along with the BV signal line. When the link 107 receives the last entry of the package, it sends back the last IBACK. When the link 107 receives the last IBACK, it removes its PREQ0 request signal. When the link 117 sees that the package request has been removed, it removes the PACK1 signal. If the link 107 has another transaction package in its input job queue 202, it asserts the PREQ0 line again, after the PACK1 signal from the previous package has been negated.

When a link has received the complete transaction package from the other link, it then initiates that transaction on its own system bus.

The primary function of the interprocessor link is to allow operational transfers between processors, in particular, to allow transfers from a processing unit in one processor to the main store in the other processor. The need for this function arises as a result of the duplication of information stored in the main stores, which information is shared, i.e., referenced, by both processors. When one processor wishes to change the shared information in the duplicated stores, it must use a semaphore to lock the information so that the other processor does not reference that information while the one processor is in the process of updating the information. Because the stores are duplicated, a processor must lock not only its own main store, but also the duplicated main store on the other side.

The locking and unlocking of various blocks of information in a main store is done by performing a read-modify-write (RMW) operation on a semaphore of that main store that is associated with the block of information of concern. The semaphore is a predesignated location of each main store. As the name implies, an RMW operation involves reading the contents of a storage location, modifying the read-out contents, and writing the modified contents back into the storage location. The original, unmodified, contents of the location are also sent to the requesting unit as the reply. The requesting unit examines the reply to determine therefrom if it has successfully locked the semaphore, or if the semaphore is currently locked by some other unit. The RMW operation is executed in the main store by main store circuitry in response to receipt of an RMW instruction in the command field of the transaction. The RMW operation is executed atomically, in that the executing circuitry of the main store does not allow other main store operations to be performed while executing the RMW operation.

A processing unit of the processor0 101 may lock the main store 112 of the processor1 111 explicitly, by asserting the EXTERNAL bit in the destination code and specifying main store as the destination of the transaction. This indicates that the destination of the operation is the main store 112 only and not the main store 102. Such an RMW operation is performed only on the main store 112 of the processor 111. It is performed only when the system 100 is not in update mode.

A processing unit of the processor0 101 may also lock the main store 112 implicitly, by specifying main store as the destination of the transaction without asserting the EXTERNAL bit, while the system 100 is in the update mode. This indicates that both main stores 102 and 112 are the destination of the operation. Thus a transfer to both the internal and the external main store results from a single request of the processing unit, and the RMW operation is performed on the main stores 102 and 112 of both processors 101 and 111. But the memory operation that is sent to the other processor is not generally performed at the same time as the memory operation in the source processor.

There is an important distinction between a read-modify-write operation directed to the other processor's main store only (an external operation) and a read-modify-write operation directed to both processor's main stores (an update operation). In the case of the former, the source processing unit expects a response from the other processor's main store. However, in the latter case, the source processing unit does not expect a response from the other processor's, external, main store, since it will receive a response from its own processor's, internal, main store. The links 107 and 117 therefore provide means by which the response from the external main store to an update read-modify-write operation is blocked from reaching the source processing unit.

Figure 3A:
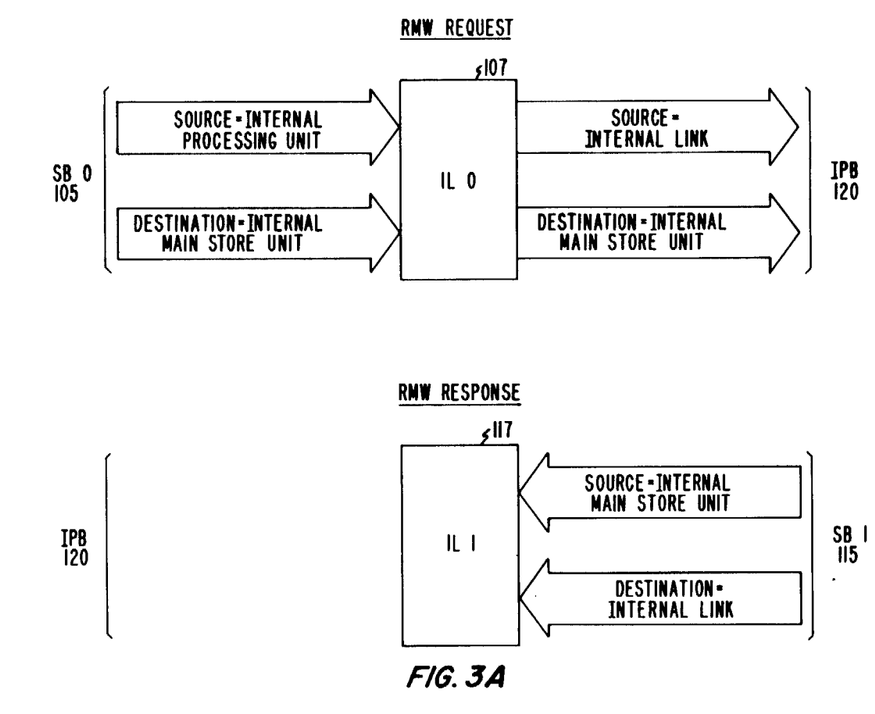
FIGS. 3A and 3B are functional diagrams of two types of read-modify-write transactions of the interprocessor links of FIG. 1.
Figure 3B:
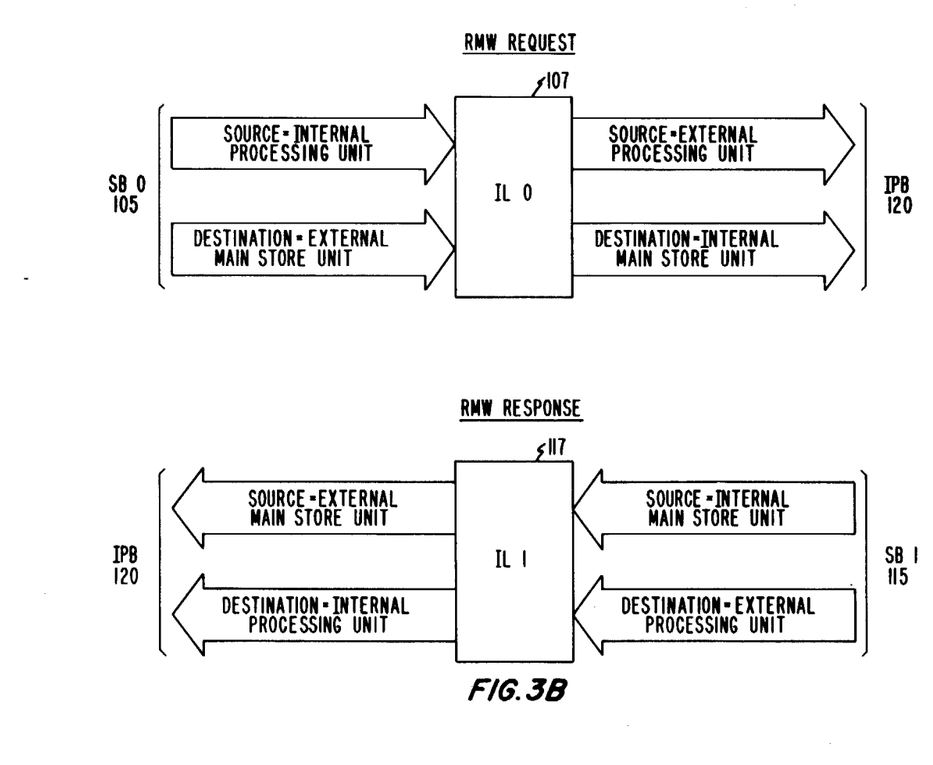

The means by which the links accomplish this result is functionally diagramed in FIGS. 3A and 3B. As these figures suggest, the scheme is dependent upon specifying the link as the source of the read-modify-write in the update operation case, while the source processing unit is specified as the source in the EXTERNAL operation case.

FIG. 3A shows the transactions of an update read-modify-write operation. Assuming that a processing unit 103 or 104 of the processor0 101 is the source of the RMW request, the link 107 receives the transaction specifying the internal processing unit 103 or 104 in the source code, and specifying the internal main store unit 102 in the destination code. Not only does the main store 102 respond to this transaction and execute an RMW operation on itself, but the link 107 recognizes that it is the implicit destination of the transaction. As was discussed above, the system bus interface 200 of the link 107 changes the source code of the received transaction to specify internal link. The link 117 is internal from the viewpoint of the processor1 111 to which the link 107 forwards the modified transaction over the interprocessor bus 120. The link 117 passes the transaction to the main store unit 112, without change. The main store unit 112 executes the requested RMW operation on itself, and acknowledges the execution by sending a response transaction on the system bus 115 that identifies internal main store unit as the source of the transaction, and internal link as the destination. From the viewpoint of the main store unit 112, it is the internal main store unit and the link 117 is the internal link.

Seeing that it is the destination of the transaction, the link 117 does not forward the response transaction to the link 107, but merely discards it. Thus the response from the main store unit 112 of the processor1 111 is blocked from reaching the source processing unit 103 or 104 of the processor0 101.

The transactions of an external read-modify-write operation are shown in FIG. 3B. Again assuming that a processing unit 103 or 104 of the processor0 101 is the source of the RMW request, the link 107 receives the transaction specifying the internal processing unit 103 or 104 in the source code, and specifying the external main store unit 112 in the destination code. Because the external main store unit 112 is specified, only the link 107 and not the main store 102 responds to this transaction. The system bus interface unit 200 of the link 107 recognizes that the link 107 is a destination of the transaction, and it changes the source code of the transaction to specify external processing unit and changes the destination code to specify the internal main store unit.

As in the example of FIG. 3A, the internal and external designations reflect the viewpoint of the processor1 111 to which the link 107 forwards the modified transaction over the interprocessor bus 120. The link 117 passes the transaction to the main store unit 112 without change. The main store unit 112 executes the requested RMW operation, and acknowledges it by sending a response transaction on the system bus 115 that identifies the internal main store unit 112 as the source of the transaction and the external processing unit 103 or 104 as the destination. The link 117 recognizes that it is the destination of the transaction. The system bus interface of the link 117 receives the transaction and changes its source code to specify external main store unit and changes the destination code to specify internal processing unit. In this case, the internal and external designations reflect the viewpoint of the processor0 101 to which the link 117 forwards the modified transaction over the interprocessor bus 120. The link 107 then sends the transaction to the designated processing unit 103 or 104 without change.

Consideration is now turned to the system bus arbiter (SBA0) 106 shown in FIG. 4. The arbiters 106 and 116 are the same, and therefore the discussion of the arbiter 106 pertains to the arbiter 116 as well. Bus arbiters are known in the art, and therefore only those portions of the arbiter 106 that are relevant to an understanding of the invention are shown in FIG. 4 and are discussed below.

The arbiter 106 includes a conventional arbitration circuit (ARB) 300. The system bus request (SBREQ) lines of the plurality of units of the processor0 101 that are capable of using the system bus are connected to the arbitration circuit 300 through a system bus request control (SBREQCTRL) circuit 301. System bus grant (SBGRANT) lines lead away from the arbiter 106, each to one of the units that are capable of using the bus. The SBGRANT lines also connect to the system bus request control circuit 301. Read-modify-write intraprocessor request (RMWREQ) lines of those units of the processor0 101 that are capable of initiating an update RMW operation connect to the system bus request control circuit 301 and to the inputs of an ORing circuit 303. Output of the ORing circuit 303, referred to as a unit request (UREQ) represents a composite read-modify-write intraprocessor request. It leads to a read-modify-write-control (RMWCTRL) circuit 302. An output of the RMWCTRL circuit 302, referred to as GO, represents a composite read-modify-write intraprocessor grant. It connects to the system bus request control circuit 301 and to a disable (DIS) input of the ORing circuit 303.

The ORing circuit 303 logically combines the signals appearing at its inputs into a single composite signal. The circuit 303 selectively gates the composite signal to its output. The gating function of the circuit 303 is controlled by the GO signal line from the RMWCTRL circuit 302 and by an RMWST signal line from an RMW start detector 305 of the arbiter 106. These signal lines are connected to the disable (DIS) and enable (EN) inputs, respectively, of the circuit 303. Until a GO signal is issued by the RMWCTRL 302, the circuit 303 is enabled and it gates the composite signal out onto the UREQ signal line. Assertion of the GO signal line by the RMWCTRL disables the circuit 303, causing it to block the composite signal from its output and to keep the UREQ signal line negated. Assertion of the RMWST signal line by the detector 305 reenables the circuit 303.

The RMWST signal is generated by the RMW start detector 305 when it detects that a unit of the processor0 101 other than the link 107 has successfully started perfomance of an update RMW operation. The RMW start detector 305 monitors the SBC bus to determine if an operation is an RMW. It monitors the SBDC bus to determine if the destination of the operation is the main store unit 102. And it monitors the SBGRANT lead of the link 107 to make sure that the link 107 is not the source of the transaction. Also, the RMW start detector 305 monitors the SBBA signal to make sure that the bus transaction has not been aborted and is proceeding successfully. If all these conditions are satisfied, the RMW start detector 305 asserts the RMWST signal line.

The system bus request control circuit 301 is a gating circuit. Until a GO signal is issued by the RMWCTRL 302, the circuit 301 blocks the SBREQ signal of any unit that is also issuing an RMWREQ signal from reaching the arbitration circuit 300. Hence before the GO signal is given, the arbitration circuit 300 arbitrates between system bus requests, and grants system bus use to only those units that do not wish to perform an update RMW operation.

Assertion of the UREQ signal line by the ORing circuit indicates to the RMWCTRL circuit 302 that a request for performance of an update RMW operation is pending, and the circuit 302 pulses the GO signal line when it determines that the RMW operation may proceed. Receipt of the GO signal causes the SBREQCTRL circuit 301 to pass all pending SBREQ signals to the arbitration circuit 300. Hence after the GO signal is given, the arbitration circuit 300 arbitrates between all system bus requests, including those of processing units wishing to perform an RMW operation. When the arbitration circuit 300 grants intra-processor system bus use to a processing unit wishing to perform an update RMW operation, by asserting the SBGRANT line, and that unit begins successful performance of that update RMW operation, the RMW start detector 305 pulses the RMWST line. Receipt of the RMWST signal causes the SBREQCTRL circuit 301 to again block the SBREQ signals of any units currently also asserting their RMWREQ lines from reaching the arbitration circuit 300.

The RMWCTRL circuit 302 controls when an update RMW operation may be performed. In particular, it is the task of the RMWCTRL circuit 302 to make sure that an update RMW operation initiated in either processor is performed on both processors before another update RMW operation is allowed to be performed. Other updates RMW operations that are initiated either simultaneously with, or subsequently to, the one initiated update RMW operation are prevented from being performed before the one update RMW operation is performed. For this purpose, the RMWCTRL circuit 302 is connected to a like RMWCTRL circuit of the other system bus arbiter 116 by an interarbiter communication channel (IAC) 121.

The interarbiter channel 121 comprises four signal lines. The RMWCTRL circuit 302 generates a read-modify-write interprocessor request by asserting the side0 arbiter request (AREQ0) line, to notify the arbiter 116 that it wishes to allow an update RMW operation to be performed. The RMWCTRL circuit of the arbiter 116 generates a read-modify-write interprocessor grant to signal its acquiescence, by asserting the side1 arbiter acknowledgment (AACK1) line. In a similar manner, the RMWCTRL circuit of the arbiter 116 sends notice of an update RMW operation to the RMWCTRL circuit 302 of the arbiter 106 on the side1 arbiter request (AREQ1) line, and the RMWCTRL circuit 302 signals its acquiescence on the side0 arbiter acknowledgment (AACK0) signal line.

Figure 5:
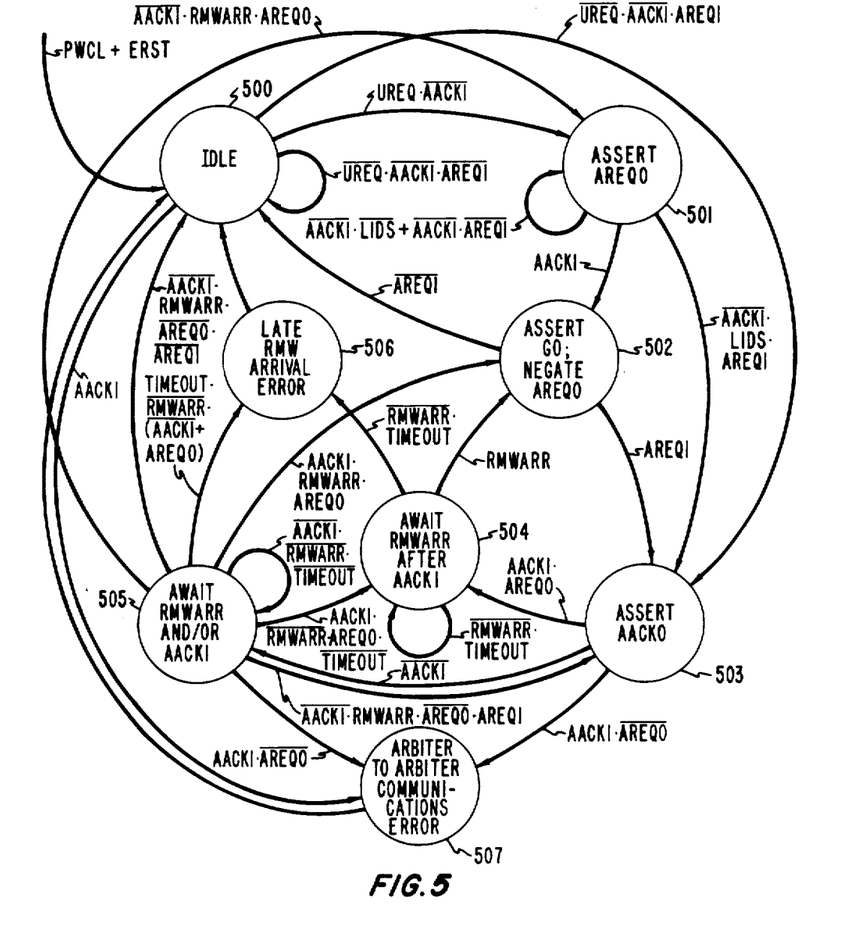
FIG. 5 is a state diagram of the read-modidy-write controller of the system bus arbiter of FIG. 4.

The operation of the RMWCTRL circuit 302 is defined by the state diagram of FIG. 5. When no requests for an update RMW operation are pending from units of the processor0 101 or from the other arbiter 116, the RMWCTRL circuit 302 is in the IDLE state 500. The circuit 302 enters the IDLE state 500 in response to initialization or a system reset which activates a power clear (PWCL) signal, or in response to the occurrence of a fatal error in the processor0 101 which results in an error stop (ERST) signal. In the IDLE state 500, all output signal lines of the circuit 302 are negated. The circuit 302 remains in the IDLE state 500 for as long as the UREQ input signal line is negated, indicating that no units of the processor0 101 are requesting an update RMW operation, the AREQ1 signal line is negated, indicating that no update RMW operation has been initiated at the other processor, and the AACK1 signal line is negated, indicating that the other arbiter 116 has not given the arbiter 106 the go-ahead to perform an update RMW operation.

Since in the IDLE state 500 the circuit 302 is not issuing an arbiter request to the other arbiter 116, receipt by the circuit 302 of the arbiter acknowledgment signal from the arbiter 116 would cause the circuit 302 to enter the ERROR state 507 to signal an error in arbiter-to-arbiter communications. Thereafter the circuit 302 would return to the IDLE state 500.

Receipt of the UREQ signal indicates to the circuit 302 that at least one of the units of the processor0 101 is requesting an update RMW operation, and causes the circuit 302 to enter state 501. In this state 501 the circuit 302 asserts the ARQ0 signal line to notify the other arbiter 116 that it wishes to allow performance of an update RMW operation. The circuit 302 then awaits receipt of the arbiter acknowledgment signal from the arbiter 116.

The circuit 302 is connected to the LIDS signal line of the processor0 101 to determine whether the arbiter 106 is the master or the slave, i.e., which of the two arbiters 106 and 116 has priority of inter-arbiter communications. If the arbiter 106 is designated the master arbiter by the LIDS signal line, the circuit 302 does not respond to arbiter requests from the arbiter 116 and remains in the state 501 until it receives arbiter acknowledgment from the arbiter 116.

But if the arbiter 106 is designated the slave and the circuit 302 receives an arbiter request from the arbiter 116, the circuit 302 leaves the state 501 and enters state 503 in which it issues an arbiter acknowledgment to the arbiter 116 by pulsing the AACK0 line, allowing the arbiter 116 to proceed with an update RMW operation first. The arbiter request of the circuit 302 to the arbiter 116 remains pending.

Having entered state 503 from the state 501, the slave circuit 302 has not yet received an arbiter acknowledgment from the arbiter 116, i.e., the AACK1 line has not been asserted. Hence the circuit 302 leaves state 503 and enters state 505 to await receipt of the arbiter acknowledgment from the arbiter 116. But having given an arbiter acknowledgment to the arbiter 116, to allow the processor1 111 to commence an update RMW operation, the circuit 302 expects the link 117 of the processor1 111 to transfer the update RMW transaction to the link 107 and the link 107 to perform the update RMW operation on the main store 102 within a predetermined time period. Successful performance of the RMW transaction on the main store unit 102 of the processor0 101 is signalled to the circuit 302 by an RMW arrival detector 304 via assertion of an RMWARR signal line (see FIG. 4). Hence in the state 505 the circuit 302 begins to time the predetermined time period while also awaiting receipt of the RMWARR and the AACK1 signals.

Turning momentarily to FIG. 4, the RMWARR signal is generated by the RMW arrival detector 304 when it detects successful arrival of an update RMW operation from the link 107 at the main store unit 102. The detector 304 monitors the SBUD line to determine if the system 100 is in update mode. It monitors the SBC bus to determine if an operation is an RMW. It monitors the SBSC bus to determine if the operation comes from the link 107. It monitors the SBDC bus to determine if the destination of the operation is the main store unit 102. And it monitors the SBACK line of the main store unit 102 to determine whether the bus transaction has successfully arrived at the main store unit 102. When it finds all of these conditions satisfied, the detector 304 asserts the RMWARR signal line.

Returning now to consideration of FIG. 5, if the slave circuit 302, its arbiter request still pending, receives the RMWARR signal in the state 505 before the predetermined time expires, it knows that the link 107 has successfully performed on the main store 102 the RMW transaction that it received from the processor1 111. Therefore the circuit 302 reenters the state 501 to await receipt of the arbiter acknowledgment to its pending arbiter request. In and from the state 501 the circuit 302 proceeds in the manner described previously.

If the slave circuit 302 does not receive the RMWARR signal in the state 505 before the predetermined time expires and while its arbiter request is still pending, it enters an RMW late arrival error state 506 to signal the system that the RMW operation transaction was not successfully performed by the link 107 on time. From the state 506 the circuit 302 enters the IDLE state 500. But since the slave circuit 302 has not yet asserted the GO signal line, the UREQ signal line is still asserted. Hence the circuit 302 reasserts the AREQ0 line and resumes the state 501 to await receipt of the AACK1 signal.

If the slave circuit 302 receives both the AACK1 signal and the RMWARR signal in the state 505, it enters the state 502 to activate the GO signal and thereby enable its processor's RMW operation to proceed.

Finally, if the slave circuit 302 receives in the state 505 the AACK1 signal but not the RMWARR signal, it enters state 504. In this state the circuit 302 continues to time the predetermined time period while awaiting the RMWARR signal.

In the state 504, if the predetermined period times out without receipt by the circuit 302 of the RMWARR signal, the circuit 302 enters the state 506, wherein it performs activities as described previously. But if the circuit 302 receives the RMWARR signal before the predetermined period expires, the circuit 302 leaves the state 504 and enters the state 502 to issue the GO signal to enable its processor's update RMW operation to proceed. Activities of the circuit 302 in the state 502 and subsequent states are described below.

Considering in summary the conditions under which the slave circuit 302 undergoes the transitions from the state 503 to the state 502, through the states 505 and 504, it is seen that under normal, i.e., non-erroneous, conditions, the circuit 302 issues a GO signal only if successful performance by the processor0 101 of an update RMW operation, as signalled by the RMWARR signal line, has followed issuance by the circuit 302 of an AACK0 signal.

Returning to consideration of the state 501, while the circuit 302 is in the state 501, receipt of the arbiter acknowledgment from the arbiter 116 signals to the circuit 302 that the requested RMW operation may proceed. This is true whether the arbiter 106 is designated the master or the slave by the LIDS signal line. In response, the circuit 302 enters state 502 in which it pulses the GO signal to allow the requested RMW operation to proceed. If an arbiter request from the arbiter 116 is not then pending, the circuit 302 reenters the IDLE state 500. Assertion of the GO line causes the circuit 303 to negate the UREQ line, and hence the circuit 302 remains in the IDLE state 500.

If the circuit 302 does receive an arbiter request from the arbiter 116 while the circuit 302 is in the state 502, the circuit enters the state 503 and issues an arbiter acknowledgment to the arbiter 116 to allow it to proceed with an update RMW operation.

Having entered the state 503, the circuit 302 has received an arbiter acknowledgment from the arbiter 116, and therefore the circuit 302 leaves the state 503 and enters state 504. In the state 504, the circuit 302 begins to time the the predetermined time period allowed for the RMW operation transaction to be successfully performed on the processor0 101. Activities of the circuit 302 in the state 504 and subsequent states have been described above.

Considering in summary the conditions under which the circuit 302, whether it be master or slave, undergoes the transitions from the state 503 to the state 502 through the state 504, it is seen that under normal conditions, the circuit 302 issues a GO signal only if successful performance on the processor0 101 of an RMW operation has followed issuance by the circuit 302 of an AACK0 signal.

Considered now will be the activities of the circuit 302 when it receives an arbiter request while it is in the IDLE state 500. If the circuit 302 receives the AREQ1 signal simultaneously with receipt of the UREQ signal, the circuit 302 gives priority to the UREQ, and it ignores the AREQ1 and proceeds to respond to the UREQ signal in the manner described above.

If the circuit 302 receives the AREQ1 signal alone, it responds by leaving the IDLE state 500 and entering the state 503, wherein it pulses its arbiter acknowledgment line to allow the processor1 111 to proceed with the RMW operation.

If the circuit 302 should receive a UREQ signal while it is in the state 503, it responds by asserting its arbiter request line and thereafter proceeding in the manner described above for the slave circuit 302 in the state 503.

If the circuit 302 should receive an arbiter acknowledgment in the state 503 even though it has not asserted its arbiter request, an error is indicated and the circuit 302 enters the state 507 to inform the system of an arbiter-to-arbiter communication error. The circuit 302 then reenters the IDLE state 500.

If the circuit 302 receives neither a UREQ nor an AACK1 signal in the state 503, it enters the state 505 to time the predetermined time period allowed for receipt of the RMWARR signal.

If the circuit 302 should receive a UREQ signal while it is in the state 505, it responds by asserting its arbiter request line and thereafter proceeding in the manner described above for the slave circuit in the state 505.

If the circuit 302 should receive an arbiter acknowledgment in the state 505 even though it has not asserted its arbiter request, an error is indicated and the circuit 302 enters the state 507 to inform the system of an arbiter-to-arbiter communication error. From the state 507 the circuit 302 reenters the IDLE state 500, as described above.

If in the state 505 the arbiter 302 receives the RMWARR signal only, it reenters the IDLE state 500. But if it receives both the RMWARR signal and an arbiter request from the arbiter 116, it reenters the state 503 to issue an arbiter acknowledgment to the arbiter 116. In and from the state 503 the circuit 302 proceeds in the manner described for when the circuit 302 first assumed the state 503.

Finally, if in the state 504 the arbiter 302 does not receive the RMWARR signal before the predetermined time period times out, it enters the state 506 to signal to the system a late RMW arrival error. In and from the state 506 the circuit 302 proceeds in the manner described previously.

Considering in summary the conditions under which the circuit 302 undergoes the transitions from the state 500 to the state 503 and back again via state 505, it is seen that, under normal conditions, the circuit 302 issues an AACK0 signal only if successful performance on the processor0 101 of an RMW operation, as signalled by the RMWARR signal line, has followed issuance by the circuit 302 of any prior AACK0 signal.

Of course, various changes and modifications to the illustrative embodiment described above will be apparent to those skilled in the art. For example, the described scheme is equally well applicable to other operations, for example write operations or test-and-set operations, or even external RMW operations that may be performed in the update mode. The RMW control mechanism need not be included in the system bus arbiters, but may be implemented separately. And the above-described scheme is not limited in its application to a dual processor system, but may be used with advantage in a multiprocessor system having any number of processors. Such changes and modifications can be made without departing from the spirit and the scope of the invention and without diminishing its attendant advantages. It is therefore intended that such changes and modifications be covered by the following claims.

What is claimed is:

1. An apparatus comprising:
   a plurality of copies of a resource, the copies being replicas of each other;
   a plurality of asynchronously and simultaneously operative processors, each for performing on the resource operations including a set of predetermined operations, wherein performance of a predetermined operation involves performing of the predetermined operation on a plurality of the copies;
   means connecting the processors with the resource for providing each processor access to a plurality of the copies; and
   means, coupled to the resource and responsive to performance by a processor on the resource of an operation included in the set, for preventing all other processors from performing an operation included in the set on a given copy until the operation is performed on the given copy, while allowing performance of any operation excluded from the set on any copy.

2. The apparatus of claim 1 wherein
   the preventing means comprise
   means for preventing all other processors from performing any second operation included in the set on any copy until the first-mentioned operation is performed on all copies.

3. The apparatus of claim 1 wherein
   the preventing means are responsive to a request by a processor to execute the first-mentioned operation on a copy.

4. The apparatus of claim 1 wherein
   the set of predetermined operations comprises resource locking operations.

5. The apparatus of claim 1 wherein
   each processor issues a first signal to request an operation included in the set, and performs the requested operation in response to receipt of a second signal; and wherein
   the preventing means comprise
   a plurality of first means connected to each other and a different one associated with each copy, each (a) responsive to receipt of a first signal from a requesting processor for issuing a third signal to the other first means, (b) responsive to receipt of a third signal for issuing a fourth signal to the first means from which the third signal was received only when performance on the associated copy of an operation included in the set has followed issuing by this first means of each prior fourth signal, and (c) responsive to receipt of the fourth signals from other first means for issuing the second signal to the requesting processor only when performance on the associated copy of an operation included in the set has followed issuing by this first means of each prior fourth signal.

6. The apparatus of claim 1 wherein
   the preventing means comprise
   a plurality of first means connected to each other, with a different first means associated with each copy, each first means responsive to performance by a processor on the associated copy of an operation included in the set for notifying thereof the other first means, and responsive to receipt of notification from another first means for preventing all other processors from performing any second operation included in the set on the associated copy until the first-mentioned operation is performed on the associated copy, while allowing performance of any operation excluded from the set on the associated copy.

7. The apparatus of claim 6 wherein
   each processor has a different first means associated therewith, each first means responsive to performance by the associated processor of an operation included in the set for notifying the other first means thereof, and responsive to receipt of notification from another first means for preventing the associated processor from performing any second operation included in the set until the first-mentioned operation is performed on all copies, while allowing the associated processor to perform any operation excluded from the set.

8. The apparatus of claim 1 wherein the replicated resource comprises a plurality of memory copies.

9. The apparatus of claim 8 wherein the set of predetermined operations consists of memory locking operations.

10. The apparatus of claim 8 wherein the set of predetermined operations consists of operations for changing memory contents.

11. An apparatus comprising:

two duplicate copies of a memory, each attached to a different processor;

a pair of simultaneously-active and asynchronously-operating processors each for performing memory operations including a memory locking operation for locking both copies;

means interconnecting the copies and responsive to performance by a processor of a locking operation on the attached copy for performing the locking operation on the other copy; and means, responsive to a request by a processor to perform a memory locking operation, for (a) allowing the requested locking operation to be performed, when all previously-allowed locking operations have been performed on both copies, and (b) preventing the requested locking operation from being performed until all previously-allowed locking operations have been performed on both copies, while allowing any other operations to be performed.

12. The apparatus of claim 11 wherein the allowing and preventing means comprise a pair of first means connected to each other and a different one attached to each copy, each first means responsive to a request by the copy's attached processor to perform a locking operation on the attached copy for notifying thereof the other first means, and responsive to receipt of notification from the other first means for preventing the copy's attached processor from performing a locking operation on the attached copy until the requested operation is performed on the attached copy, while allowing any other operations to be performed.

13. The apparatus of claim 11 wherein each processor issues a first signal to request a locking operation, and performs the requested operation in response to receipt of a second signal; and wherein the allowing and preventing means comprise a pair of first means connected to each other, with a different first means attached to each copy, each (a) responsive to receipt of a first signal from the attached processor for issuing a third signal to the other first means, (b) responsive to receipt of the third signal for issuing a fourth signal to the other first means only when performance of a locking operation on the attached copy has followed issuing of each prior fourth signal issued by this first means, and (c) responsive to receipt of the fourth signal from the other first means for issuing the second signal to the attached processor only when performance of a locking operation on the associated copy has followed issuing of each prior fourth signal issued by this first means.

14. The apparatus of claim 11 wherein the copy interconnecting means comprise, for each processor, a bus connecting the processor with the attached copy, and first means, connected to the bus, for performing on the attached copy over the bus memory locking operations performed on the other copy by the other processor; and wherein the means for allowing and preventing comprise, for each processor, second means, connected to the bus for detecting performance by the processor of a memory locking operation and generating a first signal indicative of the detection, third means, connected to the bus for detecting performance by the first means of a memory locking operation and generating a second signal indicative of the detection, fourth means, connected to the processor, for granting the processor access to the bus, in response to receipt of a processor request for access to the bus, fifth means, connected to the processor, to the second means, and to the fourth means, for blocking receipt by the fourth means of processor requests for access to the bus to perform a locking operation, in response to receipt of the first signal, and for unblocking the receipt by the fourth means, in response to receipt of a third signal, sixth means, connected to the third means, to the fifth means, and to the sixth means of the other processor, responsive to receipt of a request by the processor for access to the bus to perform a locking operation for generating an inter-processor request to the sixth means of the other processor, responsive to receipt of an inter-processor request from the sixth means of the other processor for generating an inter-processor grant if it has received the second signal subsequent to generating each prior inter-processor grant, and responsive to receipt of an inter-processor grant from the sixth means of the other processor for generating the third signal if it has received the second signal subsequent to generating each prior inter-processor grant, and seventh means, connected to the processor, to the second means, and to the sixth means, for blocking receipt by the sixth means of a request by the processor for access to the bus to perform a locking operation, in response to receipt of the third signal, and for unblocking the receipt, in response to receipt of the first signal.

15. The apparatus of claim 11 wherein the locking operation is an atomic read-modify-write operation.

16. A method of ordering performance of operations in an apparatus having a plurality of copies of a resource, the copies being replicas of each other, a plurality of asynchronously and simultaneously operative processors for performing on the resource operations including a set of predetermined operations wherein performance of a predetermined operation involves performing of the predetermined operation on a plurality of the copies, and an arrangement for connecting the processors with the resource for providing each processor access to a plurality of the copies, the method comprising the steps of:

performing an operation included in the set on a copy by a processor;

preventing all other processors from performing an operation included in the set on a given copy until the operation is performed on the given copy, in response to the first step; and allowing performance of any operation excluded from the set on any copy during the second step.

17. The method of claim 16 further comprising the steps of:

performing the first-mentioned operation on a given copy, in response to the step of performing an operation included in the set on a copy by a processor; and allowing a second operation included in the set to be performed on the given copy, in response to the step of performing the first-mentioned operation on a given copy.

18. The method of claim 16 wherein operations included in the set are resource locking operations.

19. The method of claim 16 wherein the step of performing an operation comprises the steps of issuing a first signal from a processor to a control arrangement associated with a given first copy to request an operation included in the set, and performing the requested operation by the first processor in response to receipt of a second signal from the control arrangement associated with the first copy; and wherein the step of preventing comprises the steps of issuing a third signal from the control arrangement associated with the first copy to control arrangements associated with other copies, in response to receipt of the first signal, issuing a fourth signal from the control arrangement associated with an other copy to the control arrangement associated with the first copy if performance on the other copy of an operation included in the set has followed issuing by the control arrangement associated with the other copy of each prior fourth signal, in response to receipt of the third signal, and issuing the second signal from the control arrangement associated with the first copy, if performance on the first copy of an operation included in the set has followed issuing by the control arrangement associated with the first copy of each prior fourth signal, in response to receipt of the fourth signals from the other copies.

20. The method of claim 16 wherein the step of performing an operation comprises the steps of allowing the operation to be performed when all previously-allowed operations included in the set have been performed on all copies, in response to a request by a processor to perform the operation, and preventing the operation from being performed until all previously-allowed operations included in the set have been performed on all copies, while allowing any other operations excluded from the set to be performed, in response to the request; and wherein the step of preventing all other processors is done in response to the step of allowing the operation.

21. In a dual processor system comprising a pair of processors operating simultaneously and asynchronously, each processor having at least one processing element, a memory duplicating the contents of the other processor's memory, a bus interconnecting the processing element and the memory, an arbiter coupled to the bus for arbitrating access thereto, and a link coupled for communication to the bus and to the link of the other processor, the improvement comprising in each processor:

means included in the link for receiving from a processing element a memory locking operation being performed on the memory over the bus and for transferring the locking operation to the other processor's link, and for receiving a locking operation transferred by the other processor's link and for accessing the bus to perform the transferred locking operation on the memory;

means coupled to the memory for detecting performance on the memory of the transferred operation;

means associated with a processing element and coupled to the arbiter for requesting from the arbiter bus access for the processing element to perform the memory locking operation;

means coupled to the requesting means, and responsive to the request, for signaling the request to the arbiter of the other processor;

means coupled to the detecting means, and responsive to the signaling of the request from the other processor's arbiter for signaling an acknowledgment only when its any previously-signaled acknowledgment has been followed by detection by the detecting means of performance on the memory of a locking operation transferred by the other processor's link to the receiving means; and means coupled to the detecting means, and responsive to the signaling of the acknowledgment from the other processor's arbiter for granting the requested bus access only when its any previously-signaled acknowledgment has been followed by detection by the detecting means of performance on the memory of a locking operation transferred by the other processor's link to the receiving means.

22. The system of claim 21 wherein the locking operation is a read-modify-write operation executed atomically by the memory.

23. The system of claim 21 further comprising means included in the memory for sending a response to the one of the processing element and the link which performed the locking operation on the memory.

24. The system of claim 23 wherein the locking operation is one of a first and a second type of locking operation; and wherein a link includes means coupled to the memory and responsive to receiving a response sent to it, for discarding the response to the first type of locking operation and for transferring the response to the second type of locking operation to the other processor's link, and means coupled to the processing elements and responsive to receiving a response transferred by the other processor's link, for sending the transferred response to the processing element that performed the locking operation.

25. A method of ordering multiprocessor locking operations in a dual processor system comprising a first and a second processor operating simultaneously and asynchronously of each other, each processor having at least one processing element, a memory duplicating the contents of the other processor's memory, a bus interconnecting the processing element and the memory, an arbiter coupled to the bus for arbitrating access thereto, and a link coupled for communication to the bus and to the link of the other processor, comprising the steps of:

(a) requesting from the first processor's arbiter bus-access for a processing element of the first processor to perform a memory locking operation;

(b) signaling the request from the first processor's arbiter to the second processor's arbiter;

(c) signaling an acknowledgment from the second processor's arbiter, by means for signaling the acknowledgment in response to the signaled request only when the second processor's arbiter's any previously-signaled acknowledgment has been followed by detection by the second processor's arbiter of performance on the second processor's memory of a locking operation transferred by the first processor's link to the second processor's link;

(d) granting from the first processor's arbiter of the requested bus access, by means for granting the access in response to the signaled acknowledgment only when the first processor's arbiter's any previously-signaled acknowledgment has been followed by detection by the first processor's arbiter of performance on the first processor's memory of a locking operation transferred by the second processor's link to the first processor's link;

(e) transmitting from the first processor's processing element the locking operation over the first processor's bus in response to the grant, to perform the locking operation on the first processor's memory;

(f) transferring the locking operation, received by the first processor's link over the first processor's bus, to the second processor's link;

(g) accessing the second processor's bus with the second processor's link to perform the transferred locking operation on the second processor's memory; and (h) detecting at the second processor's arbiter performance on the second processor's memory of the transferred locking operation.

* * * * *